United States Patent
Koops et al.

(10) Patent No.: US 10,012,530 B2
(45) Date of Patent: Jul. 3, 2018

(54) LIGHT SENSING DEVICE

(71) Applicant: Gentex Corporation, Zeeland, MI (US)

(72) Inventors: Luke W. Koops, Zeeland, MI (US); Kristopher R. Green, Allendale, MI (US)

(73) Assignee: GENTEX CORPORATION, Zeeland, MI (US)

(*) Notice: Subject to any disclaimer, the term of this patent is extended or adjusted under 35 U.S.C. 154(b) by 870 days.

(21) Appl. No.: 14/212,603

(22) Filed: Mar. 14, 2014

(65) Prior Publication Data

US 2014/0299748 A1     Oct. 9, 2014

Related U.S. Application Data

(60) Provisional application No. 61/785,654, filed on Mar. 14, 2013.

(51) Int. Cl.
    *G01J 1/02*        (2006.01)
    *B60S 1/56*        (2006.01)

(52) U.S. Cl.
    CPC .............. *G01J 1/0252* (2013.01); *B60S 1/56* (2013.01); *G01J 1/0271* (2013.01)

(58) Field of Classification Search
    CPC .......... G01J 1/0271; G01J 1/02; G01J 1/0204; G01J 1/0252
    See application file for complete search history.

(56) References Cited

U.S. PATENT DOCUMENTS

| | | |
|---|---|---|
| 1,153,945 A | 9/1915 | Mustin |
| 1,304,548 A | 5/1919 | De Normanville |
| 2,298,063 A | 10/1942 | MacPherson |
| 3,659,307 A | 5/1972 | Vitou |
| 3,942,863 A | 3/1976 | Schuwerk |

(Continued)

FOREIGN PATENT DOCUMENTS

| | | |
|---|---|---|
| DE | 3638983 A1 | 5/1988 |
| EP | 1227683 A1 | 7/2002 |

(Continued)

OTHER PUBLICATIONS

PCT International Search Report and Written Opinon of the International Searching Authority for International Application No. PCT/US2012/030410, dated Jun. 28, 2012 (6 pages).

*Primary Examiner* — Georgia Y Epps
*Assistant Examiner* — Don Williams
(74) *Attorney, Agent, or Firm* — Price Heneveld LLP; Bradley D. Johnson

(57) ABSTRACT

A light sensing device for a vehicle. A housing defines a light sensor cavity and a lens cover. A light sensor is positioned in the light sensor cavity and is surrounded by a gasket assembly. A manifold is configured to receive and store a fluid. A first fluid dispensing assembly extends from the manifold through the gasket assembly. The first fluid dispensing assembly is juxtapositioned above the lens cover and is configured to trickle the fluid downwardly over the manifold at a predetermined flow rate. A second fluid dispensing assembly extends from the manifold through the gasket assembly. The second fluid dispensing assembly is juxtapositioned laterally adjacent to the lens cover and is configured to expel fluid that blows across the lens cover as the vehicle moves.

20 Claims, 5 Drawing Sheets

(56) References Cited

U.S. PATENT DOCUMENTS

| | | |
|---|---|---|
| 4,187,868 A | 2/1980 | Rudolphi |
| 4,367,426 A | 1/1983 | Kumada et al. |
| 4,410,563 A | 10/1983 | Richter et al. |
| 4,414,576 A | 11/1983 | Randmae |
| 4,699,478 A | 10/1987 | Tsui et al. |
| 4,701,659 A | 10/1987 | Fujii et al. |
| 4,768,256 A | 9/1988 | Motoda |
| 4,929,072 A | 5/1990 | Fujie et al. |
| 5,007,722 A | 4/1991 | Mori et al. |
| 5,012,593 A | 5/1991 | Okada et al. |
| 5,013,888 A | 5/1991 | Okada et al. |
| 5,025,187 A | 6/1991 | Fujie et al. |
| 5,068,770 A | 11/1991 | Baziuk |
| 5,121,200 A | 6/1992 | Choi |
| 5,132,840 A | 7/1992 | Okada et al. |
| 5,136,425 A | 8/1992 | Fujie et al. |
| 5,148,312 A | 9/1992 | Kawai et al. |
| 5,155,625 A | 10/1992 | Komatsu et al. |
| 5,166,825 A | 11/1992 | Fujie et al. |
| 5,170,288 A | 12/1992 | Imaizumi et al. |
| 5,172,024 A | 12/1992 | Broussoux et al. |
| 5,233,467 A | 8/1993 | Ogasawara |
| 5,299,060 A | 3/1994 | Mori et al. |
| 5,315,333 A | 5/1994 | Nash |
| 5,418,643 A | 5/1995 | Ogasawara et al. |
| 5,475,530 A | 12/1995 | Fujie et al. |
| 5,503,515 A | 4/1996 | Moorehead |
| 5,572,354 A | 11/1996 | Desmond et al. |
| 5,594,585 A | 1/1997 | Komatsu |
| 5,708,859 A | 1/1998 | Tajima et al. |
| 5,721,639 A | 2/1998 | Aoshima et al. |
| 5,724,186 A | 3/1998 | Collier |
| 6,138,319 A | 10/2000 | Benoit |
| 6,288,845 B1 | 9/2001 | Harada |
| 6,322,258 B1 | 11/2001 | Ryan et al. |
| 6,352,758 B1 | 3/2002 | Huang et al. |
| 6,587,573 B1 | 7/2003 | Stam et al. |
| 6,607,606 B2 | 8/2003 | Bronson |
| 6,648,477 B2 | 11/2003 | Hutzel et al. |
| 6,678,045 B2 | 1/2004 | Rettig et al. |
| 6,731,867 B1 | 5/2004 | Sherwin |
| 6,816,297 B1 | 11/2004 | Tonar et al. |
| 6,911,997 B1 | 6/2005 | Okamoto et al. |
| 6,996,338 B2 | 2/2006 | Sherwin |
| 7,104,657 B2 | 9/2006 | Sherwin |
| 7,324,149 B2 | 1/2008 | Takizawa et al. |
| 7,387,454 B2 | 6/2008 | Kikuchi et al. |
| 7,486,326 B2 | 2/2009 | Ito et al. |
| 7,579,939 B2 | 8/2009 | Schofield et al. |
| 7,686,524 B2 | 3/2010 | Takizawa et al. |
| 7,813,639 B2 | 10/2010 | Yoneji |
| 7,881,496 B2 | 2/2011 | Camilleri et al. |
| 7,883,064 B2 | 2/2011 | Luft et al. |
| 7,965,336 B2 | 6/2011 | Bingle et al. |
| 8,009,979 B2 | 8/2011 | Shirono |
| 8,011,837 B2 | 9/2011 | Kawai |
| 8,044,776 B2 | 10/2011 | Schofield et al. |
| 8,049,640 B2 | 11/2011 | Uken et al. |
| 8,118,501 B2 | 2/2012 | Buschmann |
| 2002/0139394 A1 | 10/2002 | Bronson |
| 2004/0183941 A1 | 9/2004 | McCutchen |
| 2005/0275738 A1 | 12/2005 | Arai |
| 2006/0171704 A1 | 8/2006 | Bingle et al. |
| 2007/0007284 A1 | 1/2007 | Veerasamy et al. |
| 2007/0132610 A1 | 6/2007 | Guernalec et al. |
| 2007/0223899 A1 | 9/2007 | Snow |
| 2008/0068520 A1 | 3/2008 | Minikey, Jr. et al. |
| 2008/0088702 A1 | 4/2008 | Linsenmaier et al. |
| 2008/0231972 A1 | 9/2008 | Hachitani et al. |
| 2009/0257123 A1 | 10/2009 | Okazaki et al. |
| 2010/0325825 A1 | 12/2010 | Kawai |
| 2011/0005030 A1 | 1/2011 | Shirono |
| 2011/0033663 A1 | 2/2011 | Svec et al. |
| 2011/0073142 A1 | 3/2011 | Hattori et al. |
| 2011/0120494 A1 | 5/2011 | Ifuku et al. |
| 2011/0228389 A1 | 9/2011 | Ohashi |
| 2011/0242667 A1 | 10/2011 | Kulas et al. |
| 2011/0249120 A1 | 10/2011 | Bingle et al. |
| 2011/0266375 A1 | 11/2011 | Ono et al. |
| 2012/0117745 A1* | 5/2012 | Hattori ................. B60S 1/0848 15/250.01 |
| 2012/0243093 A1* | 9/2012 | Tonar ................. G02B 27/0006 359/507 |
| 2013/0219742 A1* | 8/2013 | Field ................. B60S 1/0848 34/491 |
| 2014/0036132 A1* | 2/2014 | Pawlowski .......... H04N 5/2171 348/335 |
| 2014/0060582 A1* | 3/2014 | Hartranft ................. B05B 1/06 134/18 |

FOREIGN PATENT DOCUMENTS

| | | |
|---|---|---|
| EP | 1529688 A1 | 5/2005 |
| JP | 57124238 A | 8/1982 |
| JP | 6310973 A | 11/1994 |
| JP | 8107327 A | 4/1996 |
| JP | 2004015604 A | 1/2004 |
| JP | 2007028195 A | 2/2007 |
| JP | 3941598 B2 | 7/2007 |
| WO | 2011014497 A1 | 2/2011 |

\* cited by examiner

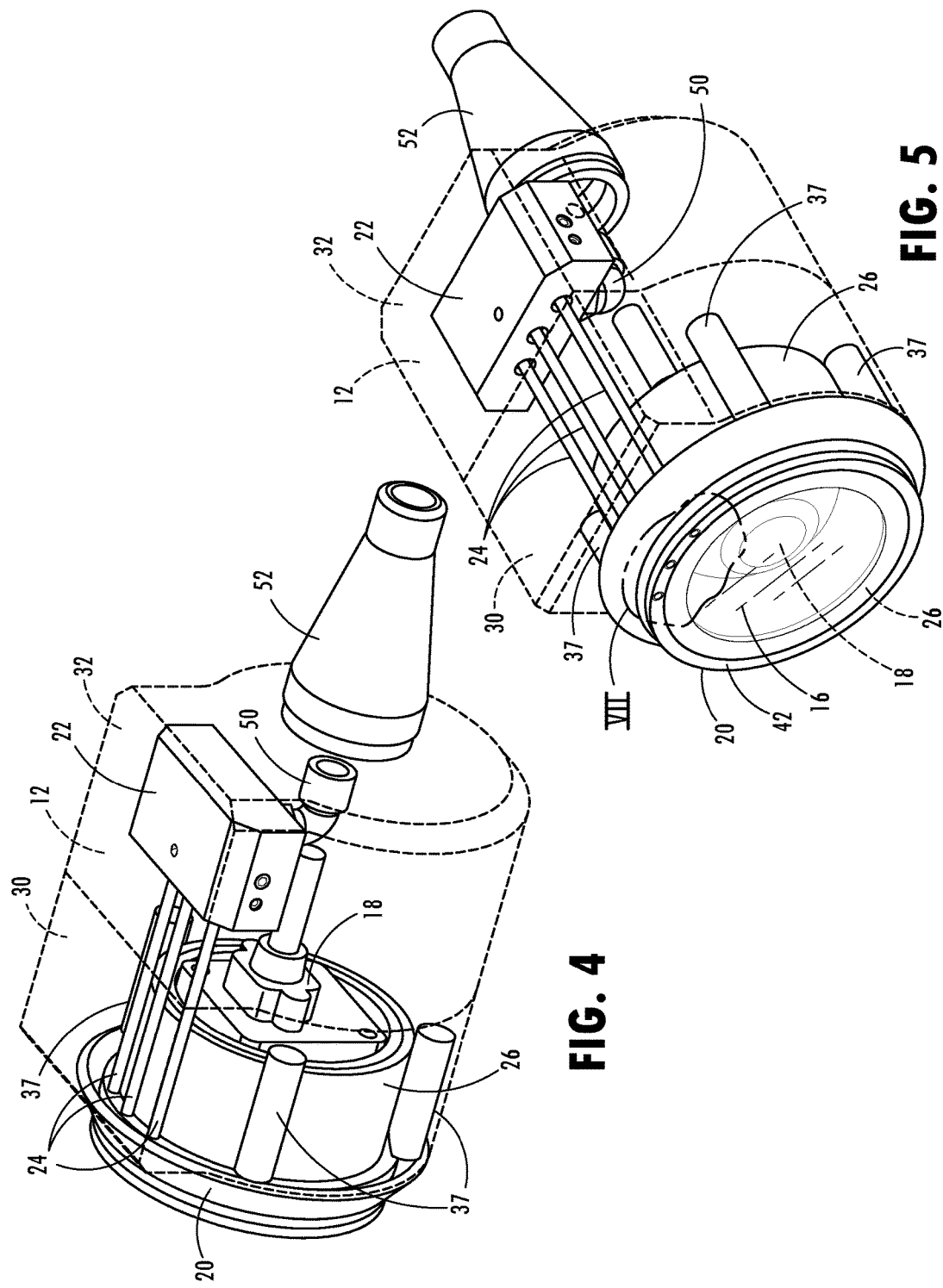

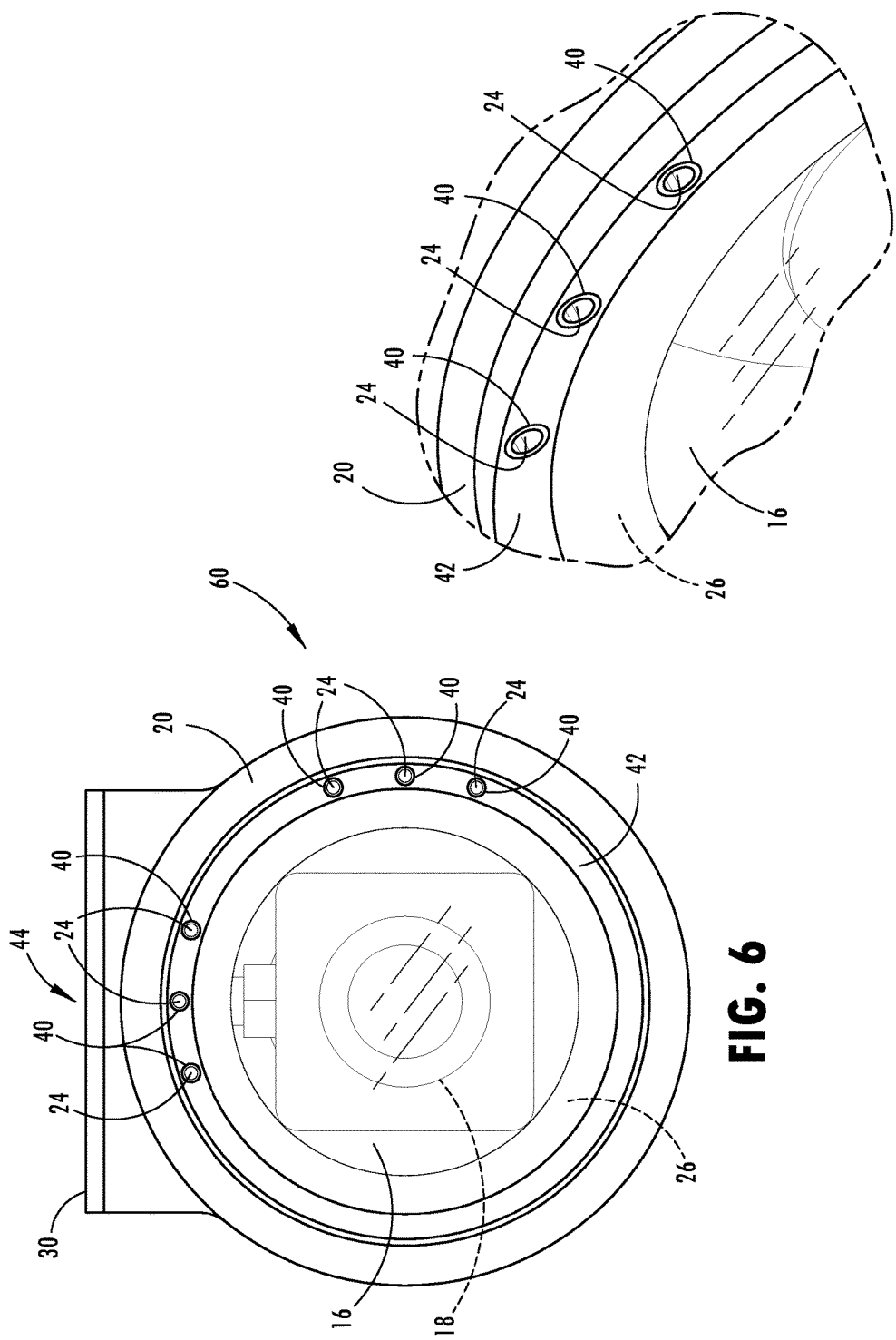

LIGHT SENSING DEVICE

CROSS-REFERENCE TO RELATED APPLICATION

This application claims the benefit of and priority to U.S. Provisional Patent Application No. 61/785,654, filed on Mar. 14, 2013, entitled "LIGHT SENSING DEVICE," the entire disclosure of which is hereby incorporated herein by reference.

BACKGROUND OF THE DISCLOSURE

The present disclosure generally relates to a light sensing device, and more particularly relates to a light sensing device with a light sensor cavity and a lens cover.

SUMMARY OF THE PRESENT DISCLOSURE

One aspect of the present disclosure includes a light sensing device for a vehicle having a housing defining a light sensor cavity and a lens cover. The housing is mounted adjacent to an exterior panel of the vehicle. A light sensor is positioned in the light sensor cavity and is surrounded by a gasket assembly. The light sensor includes a lens having a predetermined width. A piezoelectric device is disposed inside the housing and is operably coupled with the lens cover. A manifold is configured to receive and store a fluid. First and second needles extend from the manifold through the gasket assembly. The first and second needles are spaced a distance approximately equal to the predetermined width of the lens of the light sensor and are configured to trickle a predetermined volume of fluid from the manifold downwardly over the lens cover at a predetermined flow rate. A power source is operably coupled with the piezoelectric device and is configured to provide a predetermined amount of power to the piezoelectric device to operate the piezoelectric device and to atomize most of the predetermined volume of fluid expelled from the first and second needles, thereby minimizing fluid contact with the exterior panel of the vehicle.

Another aspect of the present disclosure includes a light sensing device having a housing defining a light sensor cavity and a lens cover. A light sensor is positioned in the light sensor cavity and is surrounded by a gasket assembly. The light sensor includes a lens having a predetermined width. A piezoelectric device is disposed inside the housing and is operably coupled with the lens cover. A manifold is configured to receive and store a fluid. A plurality of needles extend from the manifold through the gasket assembly. Each of the plurality of needles are equidistantly spaced a predetermined distance from the center of the lens cover. The plurality of needles are configured to expel a predetermined volume of the fluid from the manifold at a predetermined flow rate.

Yet another aspect of the present disclosure includes a light sensing device for a vehicle. A housing defines a light sensor cavity and a lens cover. A light sensor is positioned in the light sensor cavity and is surrounded by a gasket assembly. A manifold is configured to receive and store a fluid. A first fluid dispensing assembly extends from the manifold through the gasket assembly. The first fluid dispensing assembly is juxtapositioned above the lens cover and is configured to trickle the fluid downwardly over the manifold at a predetermined flow rate. A second fluid dispensing assembly extends from the manifold through the gasket assembly. The second fluid dispensing assembly is juxtapositioned laterally adjacent to the lens cover and is configured to expel fluid that blows across the lens cover as the vehicle moves.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 1A is a top perspective view of one embodiment of a light sensing device of the present disclosure;

FIG. 4 is a top perspective view of the light sensing device of FIG. 1A with the housing removed;

FIG. 5 is a front top perspective view of the light sensing device of FIG. 1A with the housing removed;

FIG. 6 is a front elevational view of the light sensing device of FIG. 1A with the housing removed; and FIG. 7 is an enlarged top perspective view of the light sensing device of FIG. 1A dispensing needles.

DETAILED DESCRIPTION OF EMBODIMENTS

Figure 1:
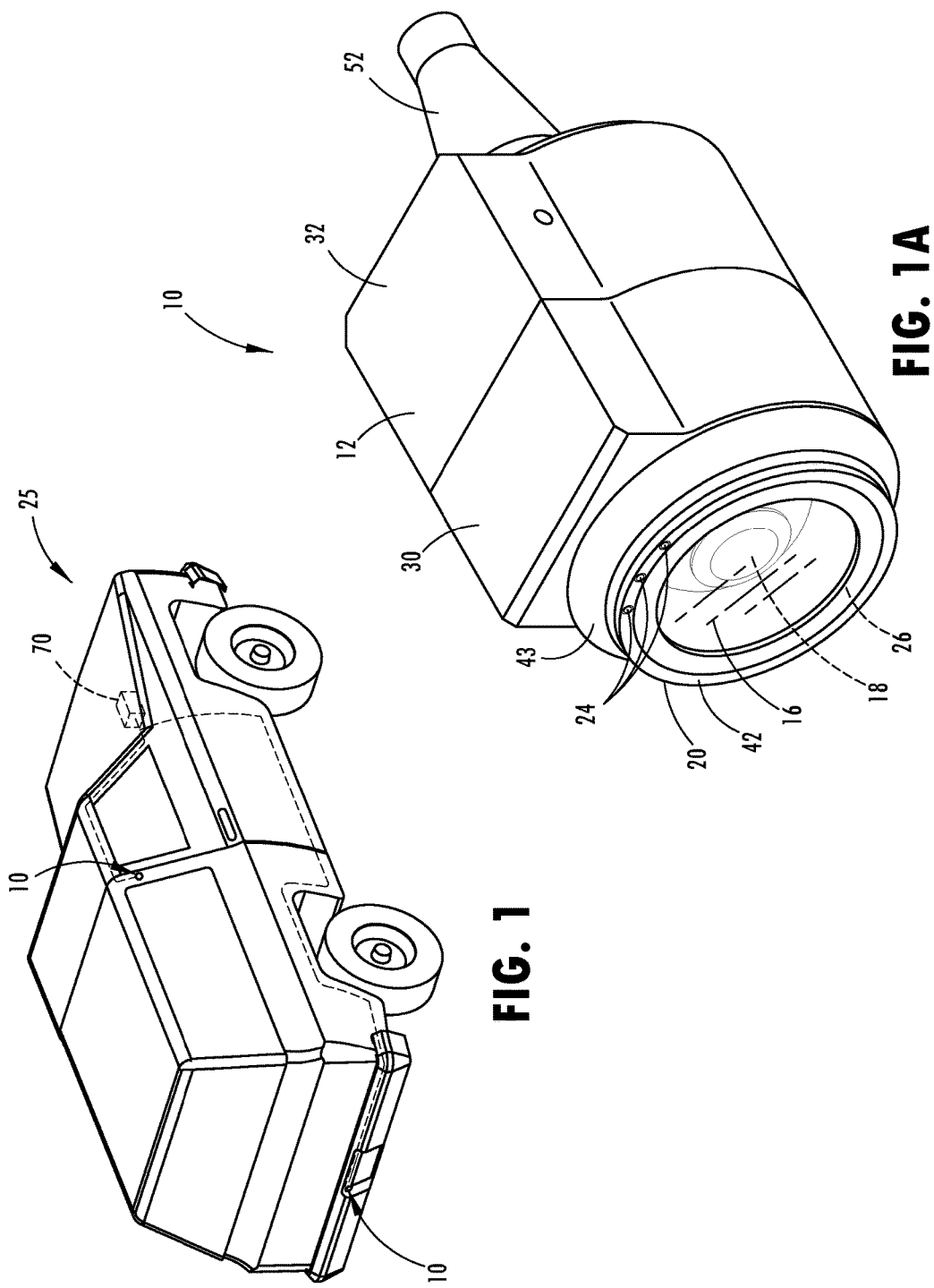
FIG. 1 is a top perspective view of a vehicle including a light sensing device of the present disclosure.
Figure 2:
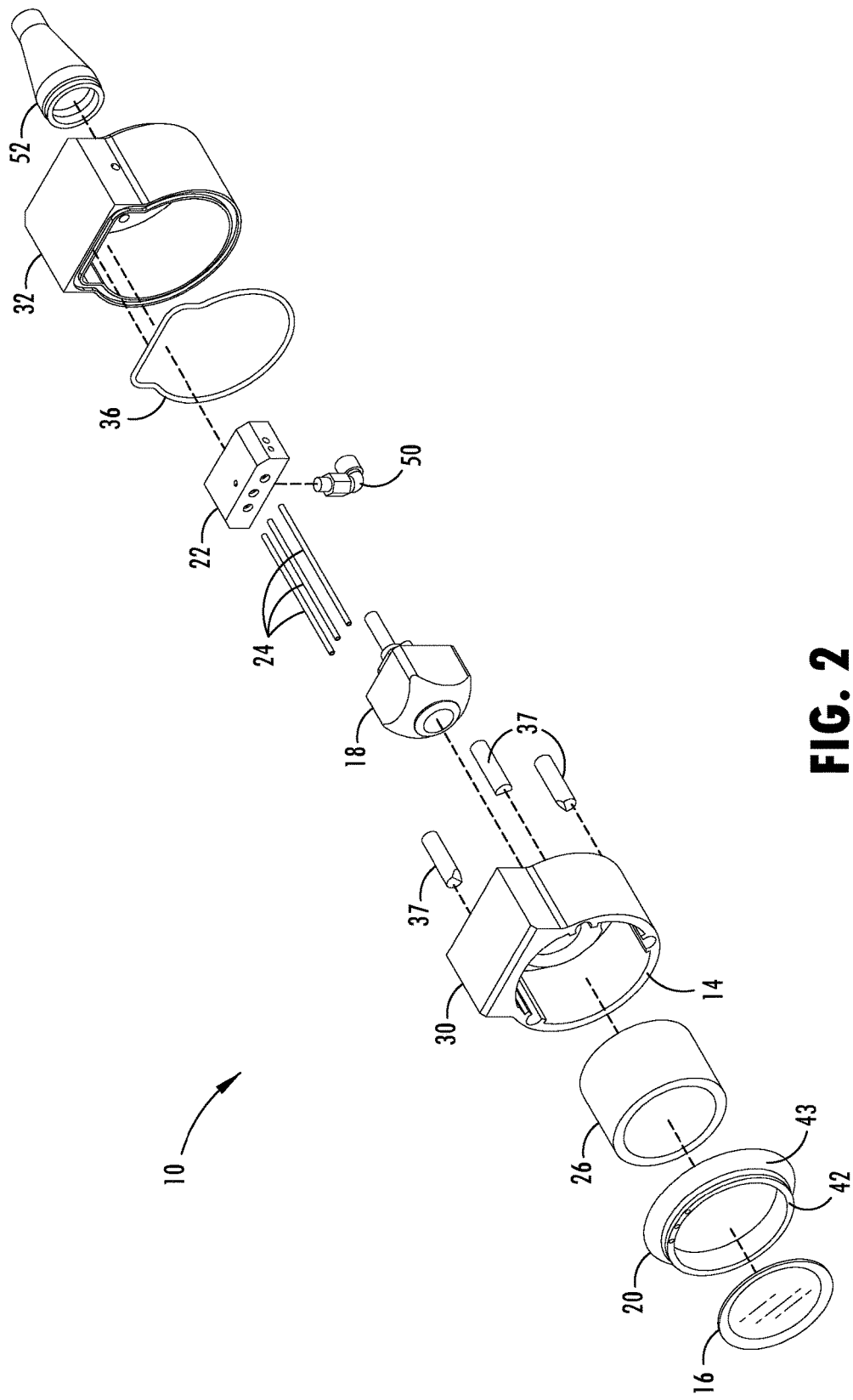
FIG. 2 is a top perspective exploded view of the light sensing device of FIG. 1A.
Figure 3:
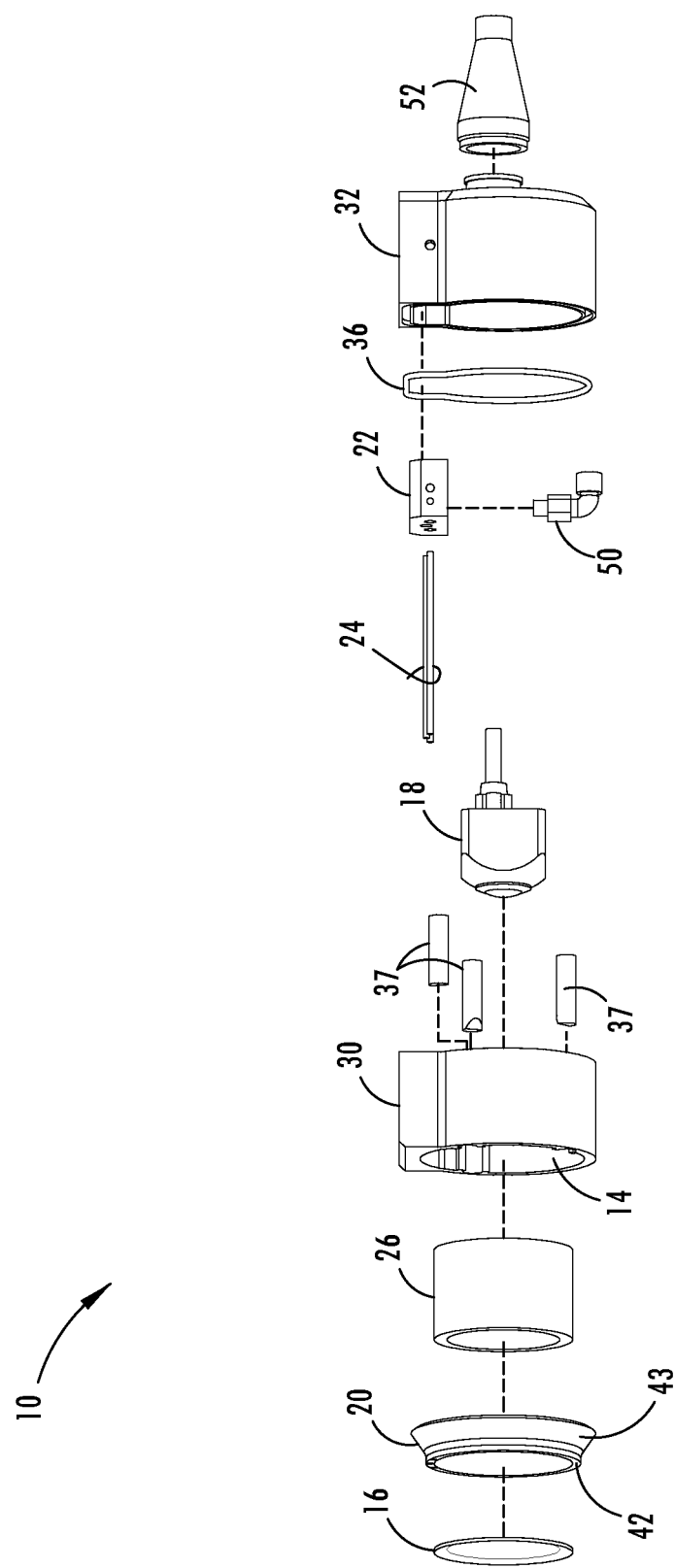
FIG. 3 is a side perspective exploded view of the light sensing device of FIG. 1A.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-7, reference numeral 10 generally designates light sensing device including a housing 12 defining a light sensor cavity 14 and having a lens cover 16. A light sensor 18 is positioned in the light sensor cavity 14 and is sealed therein by an outer gasket 20. A manifold 22 is positioned behind the light sensor cavity 14 and is configured to receive and store a cleaning fluid. At least one dispensing needle 24 extends from the manifold 22 through the outer gasket 20. The dispensing needle 24 is juxtapositioned over the lens cover 16 and is configured to expel the fluid from the manifold 22 at a predetermined flow rate.

With reference specifically to FIG. 1A, the light sensing device 10 is generally configured for use on any exterior panel of a vehicle 25. The housing 12 of the light sensing device 10 is configured to be disposed directly behind and generally concealed by the exterior panel of the vehicle 25. The outer gasket 20 generally defines an outer gasket assembly that is substantially weather-resistant and generally pliable. Accordingly, the outer gasket 20 can bend and flex with the vehicle 25 and also expand and contract through thermal cycles. The outer gasket 20 is generally exposed and in abutting contact with an exterior panel of the vehicle 25. The outer gasket 20 is generally configured to seal against the exterior panel of the vehicle 25 and also maintain a seal between the lens cover 16 and the housing 12 to protect the light sensor 18 from exposure to the elements. It is generally contemplated that the light sensing device 10 can be positioned on any area of the vehicle 25, including a rear of the vehicle 25, as well as sides, a top, a bottom, or a forward portion of the vehicle 25. In the embodiment illustrated in FIG. 1, the light sensing device 10 is positioned at a rear of the vehicle 25 as well as on a side of the vehicle 25.

Referring again to FIGS. 1-7, the illustrated housing 12 for the light sensing device 10 is generally configured for installation in or on the vehicle 25, and specifically, for installation on or behind a vehicle panel. The light sensor cavity 14 of the housing 12 can be of a variety of sizes, but is generally configured to support and protect the light sensor 18 and a piezoelectric device 26, as well as support and protect any electronics that may be disposed in the light sensor cavity 14. In the illustrated embodiment, the distance from an outside diameter of the piezoelectric device 26 to the housing 12 is approximately 0.070 inches, although this distance may vary. The light sensor 18 may be any of a variety of sensing devices, including cameras, thermal sensors, etc. The housing 12 generally includes a forward portion 30 and a rearward portion 32, which are connected by mechanical fasteners. A sealing gasket 36 extends between the forward portion 30 and the rearward portion 32 and keeps debris and moisture from entering the housing 12 between the forward portion 30 and the rearward portion 32. The forward portion 30 also includes sufficient space to receive the piezoelectric device 26 and a plurality of shock absorbent bumpers 37. The outer gasket 20 extends around the piezoelectric device 26 between the piezoelectric device 26 and a forward edge of the forward portion 30 of the housing 12.

As shown in the embodiment illustrated in FIG. 1A, the outer gasket 20 maintains a tight seal with the lens cover 16. The lens cover 16 is operably coupled to the piezoelectric device 26, such that activation of the piezoelectric device 26 causes vibratory movement of the lens cover 16. The outer gasket 20 includes at least one, and in the illustrated embodiment, three channels 40 that extend through the outer gasket 20. Each of the channels 40 is configured to receive a dispensing needle 24. As shown, there is a first dispensing needle 24, a second dispensing needle 24, and an intermediate dispensing needle 24 disposed between the first and second dispensing needles 24. As shown in FIG. 1A, the dispensing needles 24 generally define a fluid dispensing assembly 44, which each dispensing need 24 extending from the manifold 22 in the reward portion 32 of the housing 12 through the forward portion 30 of the housing 12 and into the outer gasket 20. The outer gasket 20 includes an outer rim 42 through which the dispensing needles 24 extend. The outer gasket 20 also includes a widened base 43 configured to sealingly abut an exterior panel of the vehicle 25. It is generally contemplated that the outer gasket 20 is formed from a polymeric material that has general flexibility and durability. The housing 12 is generally contemplated to include a more rigid material, such as a plastic or a metal, that is also substantially durable in construction. The dispensing needles 24 may be formed from a variety of materials, including, but not limited to plastics and metals, or any other material that allows for ease of fluid flow through the dispensing needles 24 and onto the lens cover 16.

In the illustrated embodiment, the dispensing needles 24 are positioned approximately 0.25 inches from one another, with the middle dispensing needle 24 centered over the lens cover 16. However, it will be understood that the spacing may vary, depending on the size of the lens cover 16 that will be covered with fluid. The dispensing needles 24 are approximately 76.2 mm long, but could vary from 12.7 mm to 200 mm long, depending on the application. The inner diameter of the dispensing needle 24 in the illustrated embodiment may be 1.651 mm to 1.143 mm. However, it is contemplated that the inner diameter size of the dispensing needle 24 may vary depending on the application, and in some instances, may be from 0.5 mm to 2 mm. In the illustrated embodiment, the flow rate is approximately 0.25 to 3.0 ml/s. However, it is contemplated that the flow may be less than or greater than this range, depending on the cleaning fluid used, the outside temperature, the speed of the vehicle, as well as other factors. In another embodiment, the minimum flow rate is 0.2 ml/s and 1 ml/s when three dispensing needles 24 are used. Generally, a cleaning operation will take between two seconds and 10 seconds, although this time could vary. Additionally, the dispensing needles 24 may be wrapped in an insulative material to prevent the piezoelectric device 26 from arcing to the dispensing needles 24. The wall thickness of the insulative material is approximately 0.030 inches. However, the thickness of the insulative material may vary, depending on placement of the dispensing needles 24, the material of the dispensing needles 24, as well as the material of the outer gasket 20. In the illustrated embodiment, the dispensing needles 24 terminate proximate an external surface of the outer gasket 20. However, it will be understood by one having ordinary skill in the art that the dispensing needles 24 may extend beyond the outer gasket 20, or may be recessed inside a portion of the outer gasket 20. The dispensing needles 24 receive fluid, which may be a cleaning fluid, from the manifold 22. The manifold 22 receives the fluid from a mainline 50 that feeds into a bottom portion of the manifold 22. The mainline 50 connects with a mainline gasket 52 that extends around the mainline 50 and seals therewith. Accordingly, fluid can be pushed at a predetermined optimum pressure into the mainline 50, and consequently, the manifold 22, before being dispensed through the dispensing needles 24. The manifold 22 may include set screws to securely fasten the dispensing needles 24 with the manifold 22. The flow rate of the fluid flowing through the dispensing needles 24 is generally controlled by a pump as set forth herein.

The light sensing device 10 generally illustrated in FIGS. 1-7 is secured in a vehicle with a plurality of mechanical fasteners configured to support the housing 12 in or on the vehicle. At the same time, the light sensing device 10 has exceptional modularity. Specifically, the light sensing device 10 can be removed from the vehicle while the mainline gasket 52 maintains position in the vehicle. A new light sensing device 10 can then be installed into the vehicle and the mainline gasket 52 can then be connected to the mainline 50 of the new light sensing device 10. The lens cover 16 is sealed by the outer gasket 20 in contact with the piezoelectric device 26, such that any fluid that is dispensed through the dispensing needles 24 does not pass behind the lens cover 16 into the light sensor cavity 14. Consequently, the light sensor 18, as well as any electronics connected therewith, is protected from external fluids, such as rain, sleet, snow, hail, and also environmental debris. The piezoelectric device 26 is engaged with the lens cover 16 and is formed from a piezoelectric material that vibrates upon introduction of voltage to the piezoelectric device 26. Fluid that is passed onto the lens cover 16 via the dispensing needles 24 can be atomized upon activation of the piezoelectric device 26. The plurality of shock absorbent bumpers 37 protect the forward portion 30 and the rearward portion 32 of the housing 12, as well as the manifold 22, from any vibratory damage resulting from activation of the piezoelectric device 26. The piezoelectric device 26 operates at a frequency of approximately 25 to 50 kHz, and is generally configured to sweep through a range of 25 to 50 kHz during a cleaning cycle.

The light sensing device 10 of the present application includes a low profile construction, such that the only parts of the light sensing device 10 that protrude from an exterior panel of a vehicle are the outer gasket 20 and the lens cover 16. Consequently, the build-up of dirt, snow, ice, etc. is minimized, thereby providing a higher likelihood of a clear image through the lens cover 16. Additionally, as a result of the low profile, increased airflow is drawn over the lens cover 16. It is contemplated in one embodiment that a steady laminar flow may extend over the lens cover 16, thereby blowing off debris that might otherwise come to rest on the lens cover 16. The modular construction of the housing 12 allows for a clean packaged "drop-in" design. In one embodiment, it is contemplated that a single aperture that extends through a body panel of the vehicle would be enough to accommodate the light sensing device 10 of the present disclosure. It is also contemplated that fluid may be drawn from a distal fluid source, such as a windshield wiper fluid reservoir 70 in the vehicle 25. A pump may be disposed in the housing 12 proximate the manifold 22 and in communication with the mainline 50 and the fluid.

With reference to FIGS. 6 and 7, it is generally contemplated that a second fluid dispensing assembly 60 may be disposed on at least one side of the lens cover 16. It is generally contemplated that when a vehicle is not in motion, the first fluid dispensing assembly 44, which includes at least one dispensing needle 24, and as shown in FIG. 6, three dispensing needles 24, dispenses or trickles fluid over the lens cover 16, where the lens cover 16 is energized by the piezoelectric device 26, thus atomizing the dispensed fluid. During travel, air moves across the lens cover 16, such that fluid that is expelled or trickled from the first fluid dispensing assembly 44 may never reach the lens cover 16. However, the second fluid dispensing assembly 60 can expel or trickle fluid, such that air moving past the lens cover 16 blows the fluid over the lens cover 16 prior to atomization. It is also generally contemplated that use of the first fluid dispensing assembly 44 or the second fluid dispensing assembly 60 may be determined based on the moving status of the vehicle 25 via an automated process.

In operation, in one embodiment, an operating switch is disposed inside a vehicle cabin. The operating switch can be activated by a user, which consequently activates the piezoelectric device 26, as well as flow of fluid through the manifold 22 and the dispensing needles 24. Alternatively, in another embodiment, it is contemplated that separate activation switches can be provided. A first activation switch is provided to initiate the dispensing of fluid from the dispensing needles 24, and a second activation switch is provided to activate the piezoelectric device 26, which vibrates or atomizes the fluid from the lens cover 16. The first and second activation switches are generally coupled to a power source. Accordingly, the power source is operably coupled with the piezoelectric device 26 when the first and second activation switches are closed. The power source is configured to provide a predetermined amount of power to the piezoelectric device 26 to operate the piezoelectric device 26 and atomize most or all of the predetermined volume of fluid that is expelled from the first or second or first and second fluid dispensing assemblies 44, 60. In the disclosure set forth herein, a construction that will dispense a predetermined volume of fluid is provided that is based on predetermined criteria, such as temperature, humidity, velocity of the vehicle 25, etc. The piezoelectric device 26 may be activated such that undesirable trickling of the fluid off of the lens cover 16 and onto the vehicle 25 is minimized or eliminated completely.

In yet another embodiment, an interface allowing user customization is provided. With this interface, operating system settings of an operating system can be set by the user. The operating system may include various stored data having predetermined activation criteria that controls timing and frequency of activation of the piezoelectric device 26, as well as flow characteristics of the cleaning fluid through the dispensing needles 24. The operating system is in communication with the pump and valves that control movement of fluid through the dispensing needles 24 of the first fluid dispensing assembly 44 and the second fluid dispensing assembly 60. In one embodiment, a user selects a current season of the year, and, based on the seasonal conditions associated with that season, the system runs with preset parameters that are provided with the device. In yet another embodiment, the operating system is operably coupled with a thermometer, a thermistor, or other temperature gauge, and based on outside temperature, makes a decision as to the operating time of the piezoelectric device 26, as well as fluid flow rate and operating time through the dispensing needles 24. In still another embodiment, it is contemplated that the light sensing device 10 may be operably coupled with a geographical positioning system, such that predetermined settings can be activated when the vehicle is proximate a specific location, such as home. For example, the piezoelectric device 26 may activate every time a user pulls into the driveway of a home. The system can be set up to activate and clean the light sensing device 10 and lens cover 16 before the vehicle is parked in a garage.

With reference again to FIG. 6, it is generally contemplated that the operating system of the vehicle 25 may be operably coupled with a speedometer of the vehicle 25, such that a volume of fluid, as well as through which dispensing needles 24 the fluid flows, can be controlled. For example, when the vehicle 25 is stationary, the first fluid dispensing assembly 44 disposed over the lens cover 16 may be activated based on predetermined activation criteria, as noted above. However, when the vehicle 25 is moving slowly, the volume of fluid dispensed from the first fluid dispensing assembly 44 may be lessened and some fluid may also be dispensed from the second fluid dispensing assembly 60. Still further, it is contemplated that when the vehicle 25 approaches a predetermined speed, for example, 20 miles per hour, the first fluid dispensing assembly 44 may not be activated, and instead, only the second fluid dispensing assembly 60 may be activated. In one embodiment, a length of time that the piezoelectric device 26 operates is directly proportional to the volume of fluid expelled from the first and second needles 24. It is also contemplated that a manual override may be available for each of the first and second fluid dispensing assemblies 44, 60, as well as individual dispensing needles 24 of the first and second fluid dispensing assemblies 44, 60.

In embodiment of the present disclosure, an operating sequence for the light sensing device 10 includes operation of the pump at an appropriate flow rate. As noted herein, the flow rate may depend on various parameters, including the temperature, the rate of travel of the vehicle 25, as well as other factors. The fluid flows over the lens cover 16 before the piezoelectric device 26 is activated. After a sufficient volume of fluid is disposed on the lens cover 16, the piezoelectric device 26 is activated, thereby atomizing fluid disposed on the lens cover 16. After a predetermined time, the pump deactivates, such that no further fluid is expelled or trickled from the dispensing needles 24. The piezoelectric device 26 continues to run after the pump is deactivated for at least a short amount of time. The piezoelectric device 26 is then deactivated and the lens cover 16 has been cleaned. Notably, the flow rate may be higher initially, and as the cleaning of the lens cover 16 progresses, the flow rate may lessen while the piezoelectric device 26 is operating.

The present disclosure may be used with a mounting system such as that described in U.S. Pat. Nos. 8,201,800; 8,210,695; U.S. patent application Ser. Nos. 13/600,496; 13/527,375; 13/431,657; 13/402,701; 12/187,019, and U.S. Provisional Patent Application Nos. 61/709,716; 61/707,676; and 61/704,869, which are hereby incorporated herein by reference in their entirety. Further, the present disclosure may be used with a rearview packaging assembly such as that described in U.S. Pat. No. 8,264,761; U.S. patent application Ser. Nos. 13/567,363; 13/405,697; 13/402,701; and 13/171,950, and U.S. Provisional Patent Application Nos. 61/707,625; and 61/590,259, which are hereby incorporated herein by reference in their entirety. Additionally, it is contemplated that the present disclosure can include a bezel such as that described in U.S. Pat. Nos. 8,201,800; 8,210,695; and U.S. patent application Ser. No. 13/271,745, which is hereby incorporated herein by reference in its entirety.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A light sensing device for a vehicle comprising:
   a housing defining a light sensor cavity and including a lens cover, the housing mounted adjacent to an exterior panel of the vehicle;
   a light sensor positioned in the light sensor cavity and surrounded by a gasket assembly, the light sensor including a lens having a predetermined width;
   a piezoelectric device disposed inside the housing and operably coupled with the lens cover;
   a manifold configured to receive and store a fluid;
   first and second needles extending from the manifold through the gasket assembly, the first and second needles being spaced a distance approximately equal to the predetermined width of the lens of the light sensor and configured to trickle a predetermined volume of fluid from the manifold downwardly over the lens cover at a predetermined flow rate; and
   a power source operably coupled with the piezoelectric device and configured to provide a predetermined amount of power to the piezoelectric device to operate the piezoelectric device and atomize most of the predetermined volume of fluid expelled from the first and second needles, thereby minimizing fluid contact with the exterior panel of the vehicle.

2. The light sensing device of claim 1, further comprising:
   an intermediate needle positioned between the first and second needles.

3. The light sensing device of claim 1, wherein the manifold is disposed inside the housing and is operably coupled to a fluid source.

4. The light sensing device of claim 1, further comprising:
   a pump in communication with the fluid; and
   an operating system operably coupled with the pump and configured to activate the pump based on predetermined activation criteria.

5. The light sensing device of claim 4, wherein the predetermined activation criteria is based at least in part on data obtained from a geographical positioning system.

6. The light sensing device of claim 4, wherein the predetermined activation criteria is based at least in part on data obtained from a temperature gauge.

7. The light sensing device of claim 4, wherein the predetermined activation criteria is based at least in part on data related to seasonal weather information stored in the operating system.

8. The light sensing device of claim 1, wherein a length of time that the piezoelectric device operates is directly proportional to the volume of fluid expelled from the first and second needles.

9. The light sensing device of claim 1, wherein the manifold is operably coupled to a windshield wiper fluid reservoir.

10. The light sensing device of claim 1, wherein the housing is concealed behind a vehicle panel and wherein only the gasket assembly is exposed.

11. A light sensing device comprising:
a housing defining a light sensor cavity and including a lens cover;
a light sensor positioned in the light sensor cavity and surrounded by a gasket assembly, the light sensor including a lens having a predetermined width;
a piezoelectric device disposed inside the housing and operably coupled with the lens cover;
a manifold configured to receive and store a fluid; and
a plurality of needles extending from the manifold through the gasket assembly, each of the plurality of needles being equidistantly spaced a predetermined distance from the center of the lens cover, the plurality of needles being configured to expel a predetermined volume of the fluid from the manifold at a predetermined flow rate.

12. The light sensing device of claim 11, further comprising:
a power source operably coupled with the piezoelectric device and configured to provide a predetermined amount of power to the piezoelectric device to operate the piezoelectric device and atomize most of the predetermined volume of fluid expelled from the plurality of needles.

13. The light sensing device of claim 11, wherein a length of time that the piezoelectric device operates is directly proportional to the volume of fluid expelled from the plurality of needles.

14. A light sensing device for a vehicle, comprising:
a housing defining a light sensor cavity and including a lens cover;
a light sensor positioned in the light sensor cavity and surrounded by a gasket assembly;
a manifold configured to receive and store a fluid;
a first fluid dispensing assembly extending from the manifold through the gasket assembly, the first fluid dispensing assembly being juxtapositioned above the lens cover and configured to trickle the fluid downwardly over the lens cover at a predetermined flow rate; and
a second fluid dispensing assembly extending from the manifold through the gasket assembly, the second fluid dispensing assembly being juxtapositioned laterally adjacent to the lens cover and configured to expel fluid that blows across the lens cover as the vehicle moves.

15. The light sensing device of claim 14, wherein the first and second fluid dispensing assemblies each include three dispensing needles juxtapositioned about an outer rim of the gasket assembly.

16. The light sensing device of claim 15, wherein the dispensing needles include an inner diameter of approximately 0.5 mm and 2 mm.

17. The light sensing device of claim 14, wherein the manifold is disposed inside the housing and is operably coupled to a fluid source of the vehicle.

18. The light sensing device of claim 14, wherein the fluid is delivered to the manifold from a windshield wiper fluid reservoir.

19. The light sensing device of claim 14, wherein the housing is concealed behind a vehicle panel of the vehicle and wherein only the gasket assembly is exposed.

20. The light sensing device of claim 14, further comprising:
a power source operably coupled with the piezoelectric device and configured to provide a predetermined amount of power to the piezoelectric device to operate the piezoelectric device and atomize most of the predetermined volume of fluid expelled from the first and second fluid dispensing assemblies.

* * * * *